United States Patent
James et al.

(10) Patent No.: US 6,787,257 B2
(45) Date of Patent: Sep. 7, 2004

(54) METHOD AND APPARATUS FOR OPERATING AN ELECTROCHEMICAL FUEL CELL

(75) Inventors: Gregory James, Coquitlam (CA); Rajeev Vohra, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 238 days.

(21) Appl. No.: 09/998,531

(22) Filed: Nov. 29, 2001

(65) Prior Publication Data

US 2002/0127444 A1 Sep. 12, 2002

Related U.S. Application Data

(60) Provisional application No. 60/253,824, filed on Nov. 29, 2000.

(51) Int. Cl.[7] .............................. H01M 8/04; H01M 8/10
(52) U.S. Cl. ........................................... 429/13; 429/22
(58) Field of Search ............................... 429/13, 17, 22

(56) References Cited

U.S. PATENT DOCUMENTS

| | | | |
|---|---|---|---|
| 3,553,023 A | 1/1971 | Doyle | 136/86 |
| 4,582,765 A | 4/1986 | Kothmann | 429/34 |
| 5,677,073 A | 10/1997 | Kawatsu | 429/22 |
| 5,935,726 A | 8/1999 | Chow et al. | 429/13 |
| 6,322,914 B1 | 11/2001 | Chow et al. | 429/13 |
| 6,589,678 B1 * | 7/2003 | McElroy | 429/13 |

FOREIGN PATENT DOCUMENTS

| | | | |
|---|---|---|---|
| JP | 4-306566 | 10/1992 | |
| JP | 06-203861 | 7/1994 | |
| JP | 06203861 A | * 7/1994 | H01M/8/04 |

OTHER PUBLICATIONS www.efunda.com/math/reliability/reliability (unknown date).*

* cited by examiner

*Primary Examiner*—Carol Chaney
(74) *Attorney, Agent, or Firm*—McAndrews, Held & Malloy, Ltd.

(57) ABSTRACT

An operating method increases fuel cell life or durability, particularly that of a solid polymer electrolyte fuel cell. The fuel cell has a mean life expectancy that may be empirically determined. The method comprises the step of reversing the direction of flow of at least one of the fluids supplied to the fuel cell (for example, the fuel and/or oxidant reactants) through its corresponding flow field after a time period of operation of the fuel cell. The time period is less than the mean life expectancy of the cell and has a value that is a substantial part of the mean life expectancy. The flow may be reversed once or several times over the life of the fuel cell. An improved apparatus carries out the method.

12 Claims, 3 Drawing Sheets

METHOD AND APPARATUS FOR OPERATING AN ELECTROCHEMICAL FUEL CELL

CROSS-REFERENCE TO RELATED APPLICATION

This application is related to and claims priority benefits from U.S. Provisional Patent Application Serial No. 60/253,824 filed Nov. 29, 2000, entitled "Method And Apparatus For Operating An Electrochemical Fuel Cell". The '824 provisional application is incorporated herein by reference in its entirety.

FIELD OF THE INVENTION

The present invention relates to a method and apparatus for operating an electrochemical fuel cell, such as, for example, to increase the life or durability of the cell.

BACKGROUND OF THE INVENTION

Electrochemical fuel cells convert fuel and oxidant fluid streams to electricity and reaction product. Solid polymer electrochemical fuel cells generally employ a membrane electrode assembly (MEA) comprising a solid polymer electrolyte or ion-exchange membrane disposed between two porous electrically conductive electrode layers. An electrocatalyst is typically disposed at each membrane/electrode layer interface to induce the desired electrochemical reaction.

In typical fuel cells, the MEA is disposed between two electrically conductive separator plates. A fluid flow field provides a means for directing the fuel and oxidant to the respective electrocatalyst layers, specifically, at the anode on the fuel side and at the cathode on the oxidant side. A simple fluid flow field may consist of a chamber open to an adjacent porous electrode layer with a first port serving as a fluid inlet and a second port serving as a fluid outlet. The fluid flow field may be the porous electrode layer itself. More complicated fluid flow fields incorporate at least one fluid channel between the inlet and the outlet for directing the fluid stream in contact with the electrode layer or a guide barrier for controlling the flow path of the reactant through the flow field. The fluid flow field is commonly integrated with the separator plate by locating a plurality of open-faced channels on the faces of the separator plated facing the electrodes. In a single cell arrangement, separator plates are provided on each of the anode and cathode sides. The plates act as current collectors and provide structural support for the electrodes.

The fuel stream directed to the anode by the fuel flow field migrates through the porous anode and is oxidized at the anode electrocatalyst layer. The oxidant stream directed to the cathode by the oxidant flow field migrates through the porous cathode and is reduced at the cathode electrocatalyst layer.

Solid polymer fuel cells generally use fuels, such as, for example, hydrogen or methanol, which are oxidized at the anode to produce protons. The protons migrate through the ion-conducting electrolyte membrane and react with an oxidant such as oxygen in the air at the cathode to produce water as a reaction product.

Two or more fuel cells can be connected together, generally in series but sometimes in parallel, to increase the overall power output of the assembly. In series arrangements, one side of a given plate can serve as an anode plate for one cell and the other side of the plate can serve as the cathode plate for the adjacent cell.

Such a series connected multiple fuel cell arrangement is referred to as a fuel cell stack, and is typically held together in its assembled state by tie rods and end plates. Apart from being provided with inlets and outlets for the oxidant and fuel streams, the fuel cell stack is typically also provided with a coolant inlet and outlet for the flow of a coolant through the stack.

During operation of a fuel cell various failures or problems can occur which limit the useful life or durability and ultimately the reliability of the cell. For instance, leaks may develop in the ion-exchange membrane (allowing the fuel and oxidant reactants to transfer over to the wrong electrodes) or in the various other fluid seals in the fuel cell. Failures may also occur due to build up of contaminants that collect in the fuel cell.

The types of failure which occur, resulting in declining performance of the cell or failure or breakdown of the cell, and the average time period within which such failure or failures occur can be determined experimentally for a particular type of cell or for a selected number of such cells and then averaged. This time period, whether determined for a single cell or for a selected number of cells, for which the mean value (sometimes referred to as the average value) is then obtained under conventional operating conditions is referred to herein as "mean life expectancy" or "mean time to failure" (MTTF).

SUMMARY OF THE INVENTION

An improved method operates a fuel cell or a fuel cell stack supplied with a fluid stream. The fuel cell has a mean life expectancy that may be determined empirically. The method comprises the step of reversing the direction of flow of the fluid stream after a time period of operation of the fuel cell, the time period being less than the mean life expectancy of the cell. The time period has a value that is a substantial part of the value of the mean life expectancy. A "substantial part" will typically be more than half of the mean life expectancy but may mean 1% or less of the mean life expectancy. In the present methods, the fluid flow stream is not reversed every few minutes but only after operating a substantial portion of the mean life expectancy. The method is useful in increasing fuel cell life or durability, particularly that of a solid polymer electrolyte fuel cell.

The reversed fluid stream may be either one or both of the fuel and oxidant reactant streams, thereby resulting in a flow reversal of one or both the reactants through their respective reactant flow fields in the fuel cell. Where applicable, the reversed fluid stream may be a coolant stream, thereby resulting in a flow reversal of coolant through a coolant flow field.

Reversing the fluid flow direction may change the location at which the greatest amount of degradation occurs for a given degradation mechanism, thereby delaying the onset of a fuel cell failure. The method may desirably be employed once (for instance, after the fuel cell has been operated for about 75% to about 90% of its mean life expectancy) or multiple times during the life of the fuel cell. However, a modest number of fluid flow direction reversals is preferred (for instance, less than about 10 times during the life of the fuel cell).

The fuel cell typically has a port at each end of the flow field for the fluid. The fluid stream is typically supplied to the fuel cell by a supply conduit connected to a first port (inlet) on the fuel cell. The fluid stream is typically exhausted from the fuel cell by an exhaust conduit connected to a second port (outlet). However, certain embodiments may simply vent the fluid exhaust stream (for example, air oxidant) to the surrounding atmosphere. Further, certain embodiments may dead-end the fluid flow field (for example, pure hydrogen fuel).

The flow of the fluid stream may be reversed simply by switching the inlet/outlet functions of the ports, for example, by disconnecting the supply and exhaust conduits from the first port and second ports, respectively, and then connecting the supply and exhaust conduits to the second and first ports, respectively. This may be performed manually or using an appropriate automated subsystem. Where appropriate, fluid flow may be exhausted or dead-ended at or beyond the second port instead. The fuel cell may be designed such that it is symmetric about the first and second ports in which case the fluid flow may be reversed by rotating the fuel cell to align the second and first ports with the supply and exhaust conduits respectively after the disconnecting step.

An improved fuel cell assembly comprises a fuel cell, a fluid supply conduit for supplying a fluid stream to a first fluid port on the fuel cell, a fluid exhaust conduit for exhausting the fluid stream from a second fluid port on the fuel cell, and a fluid stream flow switch for reversing the direction of flow of the fluid stream after a time period of operation of the fuel cell wherein the time period is less than the mean life expectancy of the fuel cell and is equal to a substantial part of the mean life expectancy.

The fluid stream flow switch may reverse the direction of flow of any or all of a fuel stream, an oxidant stream, or a coolant stream. The fluid stream flow switch may be manually activated or the assembly may additionally comprise a controller for activating the fluid stream flow switch. The controller may activate the flow switch automatically.

DETAILED DESCRIPTION OF PREFERRED EMBODIMENT(S)

Figure 1:
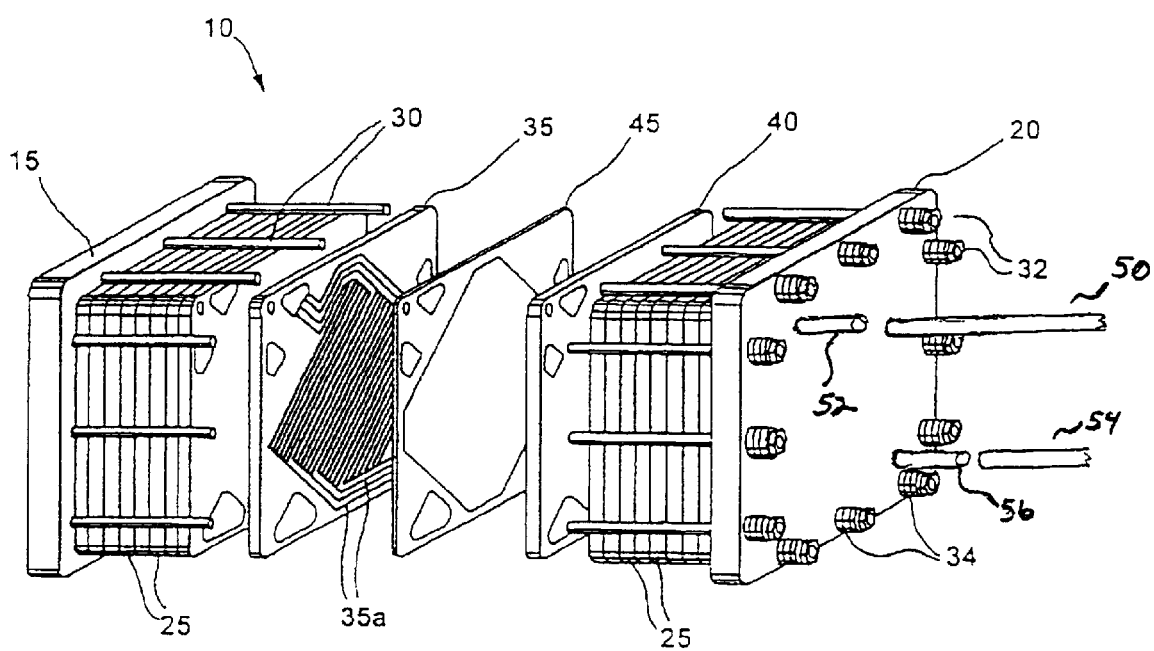
FIG. 1 is an exploded view of a solid polymer electrolyte fuel cell stack that is symmetric about the working fluid inlet and outlet ports.

It has been found that certain degradation mechanisms in fuel cells occur at rates that vary greatly with respect to the location of the working fluid inlets and/or outlets. For instance, the current densities in the regions of the fuel and oxidant reactant inlets are higher than those in the regions of the outlets in solid polymer electrolyte fuel cells. This can make enough difference to the material degradation rates in the inlet regions that related material failures may occur predominantly in the inlet regions. Similarly, cell temperature is relatively higher in the region of the reactant outlets in such cells. This can cause higher rates of temperature related seal material degradation in the outlet regions. Further, contaminants in the supplied reactant streams also tend to accumulate mainly in the inlet areas of the fuel cell, eventually resulting in a significant reduction in fuel cell performance. However, the reduction in performance is more significant than it would be if the contaminants instead had collected at the outlet areas because the inlet areas are the regions operating at the greatest current density.

To illustrate the variation of degradation with inlet/outlet location, a conventional solid polymer electrolyte fuel cell stack comprising 25 individual fuel cells was operated for about 12,000 hours on reformate fuel and air oxidant supplies. A small amount of air (2%) was admitted to the supplied fuel stream to prevent carbon monoxide poisoning of the anode catalyst. The stack was operated at full reactant pressures and power output for half of the testing period. However, by that time, many leaks developed within the stack, resulting in significant mixing of the fuel and oxidant streams within the stack. Also, the reactant fluid manifolds developed leaks at the seals, resulting in significant loss of reactant to the surrounding environment. Consequently, the stack could only be operated at reduced reactant pressures and hence at a half power output condition for the last half of the testing period.

The stack was then disassembled and the cells analyzed for the location and frequency of the various leak types.

In the Table 1 below, the number of cells in the stack is tabulated in which a particular leak and location was observed.

TABLE 1

| Leak type and location | # cells with leak |
| --- | --- |
| membrane leak near oxidant outlet | 20 |
| membrane leak near oxidant inlet | 1 |
| membrane leak near fuel outlet | 3 |
| membrane leak near fuel inlet | 17 |
| glue joint seal leak near oxidant outlet | 17 |
| glue joint seal leak near oxidant inlet | 0 |
| glue joint seal leak near fuel outlet | 5 |
| glue joint seal leak near fuel inlet | 0 |

As is evident from the foregoing data, the frequency of the various leak types varies greatly with location relative to the reactant inlets and outlets. As such, switching the inlet and outlet positions (by reversing reactant flow through the relevant flow field) may be expected to reduce the degradation rate in the more degraded regions at the expense of increasing the degradation rate in the less degraded regions. This however should postpone the onset of leaks or cell failures by averaging out the accumulated degradation over the affected cell component, thereby increasing cell lifetime. Fuel cells that employ coolants flowing through coolant flow fields also show differences in certain inlet and outlet characteristics (for example, temperature) and thus degradation phenomena may also be a significant function of the coolant inlet/outlet location. Accordingly, reversing the direction of coolant flow may also play a role in increasing fuel cell lifetime and durability.

FIG. 1 illustrates, in exploded view, a solid polymer electrolyte fuel cell stack 10, including a pair of end plates assemblies 15, 20 and a plurality of fuel cell assemblies 25. Tie rods 30 extend between end plates 15 and 20 to retain and secure stack 10 in its assembled state with fastening nuts 32. Springs 34 threaded on the tie rods 30 interposed between the fastening nuts 32 and the end plate 20 apply resilient compressive force to the stack in the longitudinal direction. Reactant and coolant fluid streams are supplied to and exhausted from internal manifolds and passages in the stack 10 via stack inlet and outlet ports in end plates 15 and 20. In FIG. 1, the fuel stream is supplied by supply conduit 50 to fuel inlet port 52 (The conduits and ports are shown in disconnected form in FIG. 1, but connected during operation) and is exhausted out exhaust conduit 54 from fuel outlet port 56. (The oxidant fuel stream and coolant stream plumbing are not shown in FIG. 1.) Fuel cell stack 10 is symmetric about ports 52, 56 and conduits 50, 54 in that ports 56 and 52 can be aligned with conduits 50 and 54 respectively by rotating stack 10 about an axis normal to end plate 20. As shown by the exploded portion of FIG. 1, each fuel cell assembly 25 includes an anode flow field plate 35, a cathode flow field plate 40, and a membrane electrode assembly 45 interposed between plates 35 and 40. Membrane electrode assembly 45 comprises an ion-exchange membrane interposed between an anode and a cathode. Plate 35 has a plurality of fluid flow channels 35a formed in its major surface facing membrane electrode assembly 45 for directing a reactant stream in contact with one of the electrodes of membrane electrode assembly 45.

Reversal of the flow direction of any of the working fluids supplied to stack 10 may be accomplished manually at appropriate times during its life. For instance, to effect a reversal of the fuel flow direction, supply conduit 50 and exhaust conduit 54 may be disconnected from ports 52 and 56 respectively and then repositioned and reconnected in the opposite order (that is, to ports 56 and 52 respectively). Alternatively, after disconnecting, the entire stack 10 may be rotated about an axis normal to end plate 20 such that supply conduit 50 and exhaust conduit 54 now align with ports 56 and 52 respectively. In this way, conduits 50 and 54 do not need to be repositioned.

Figure 2A:
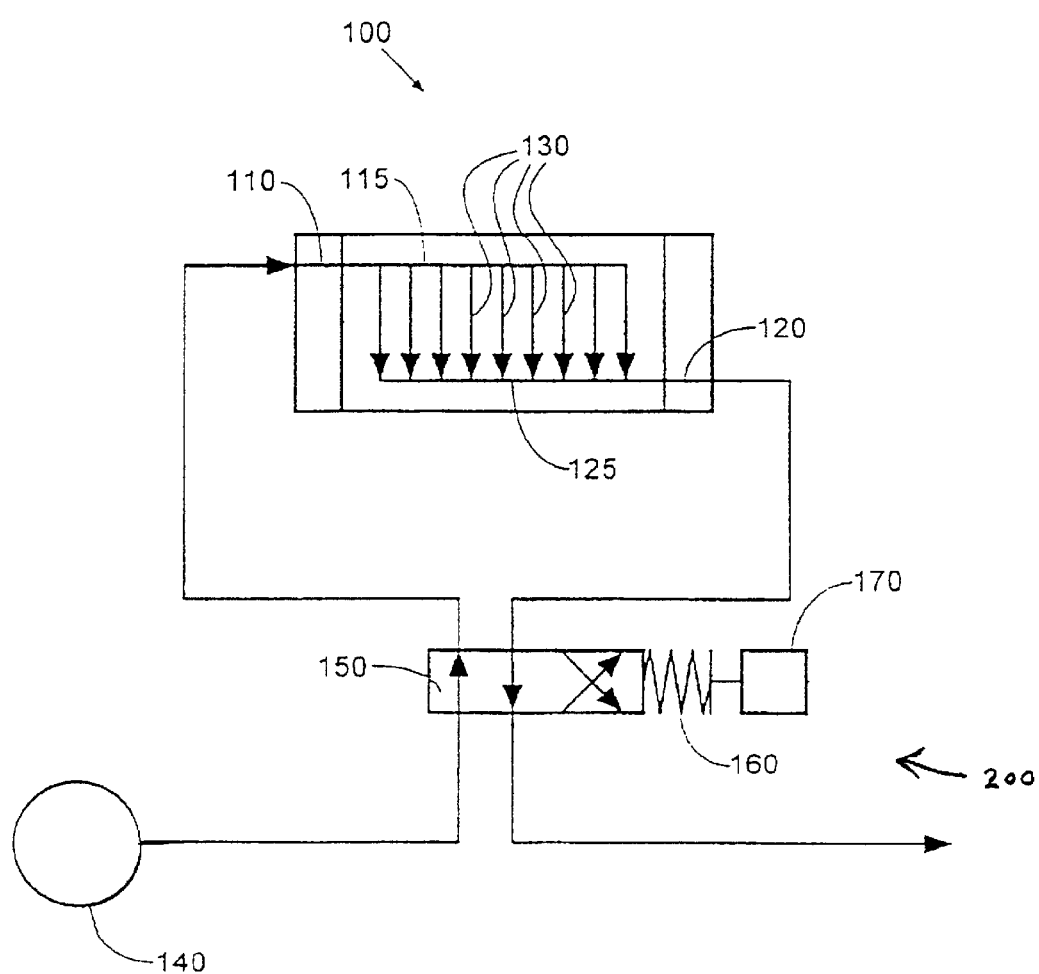
FIGS. 2a and 2b are schematic diagrams of an embodiment of a fuel cell assembly comprising a fuel stream flow switch for reversing the flow direction of the fuel stream through a fuel cell stack.
Figure 2B:
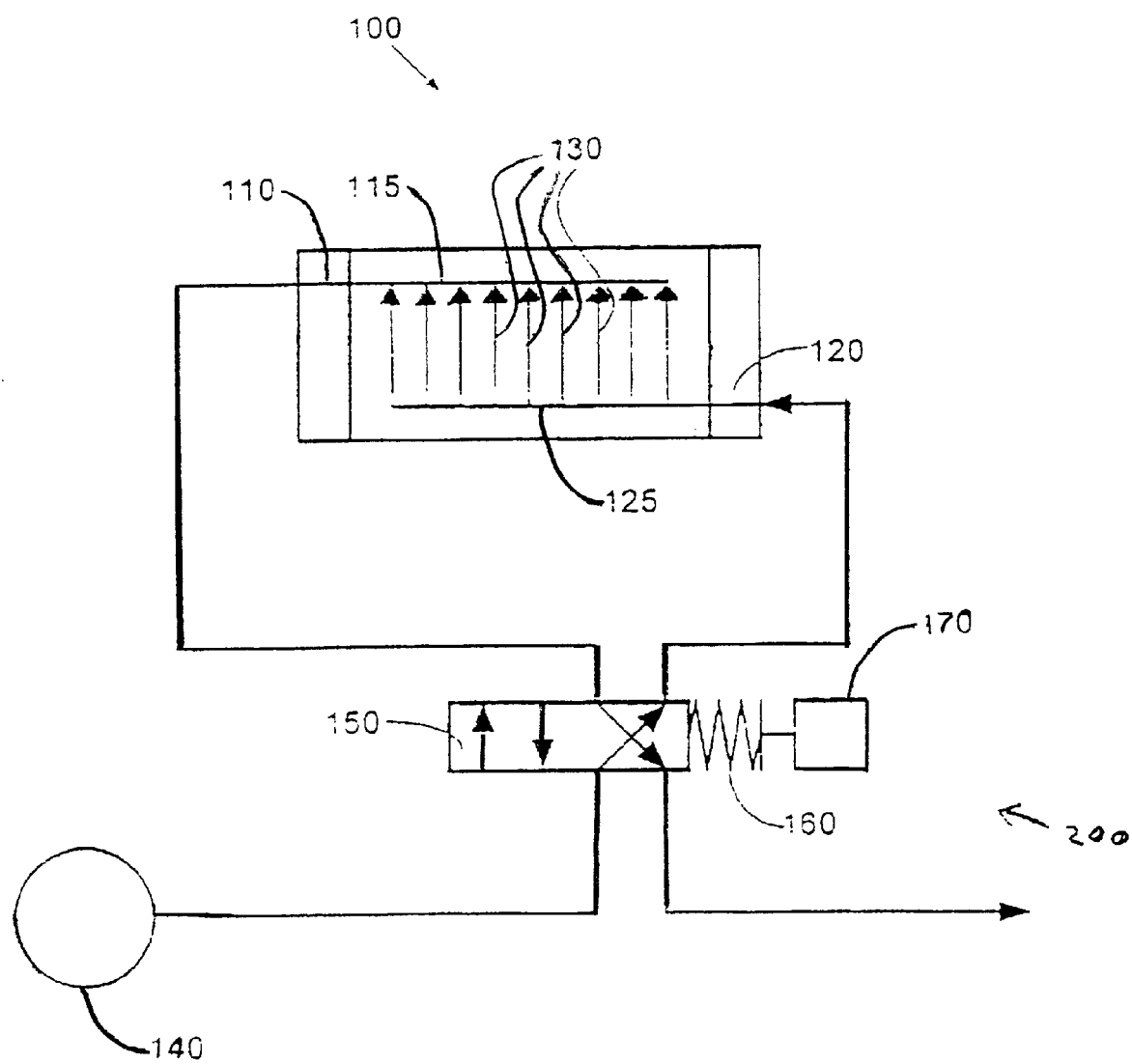

An alternative embodiment is shown in FIGS. 2a and 2b, which schematically depict a fuel cell stack 100 that has two fuel stream ports 110, 120 and associated manifolds 115, 125 for supplying and exhausting a fuel stream to and from individual fuel cells in stack 100. Lines 130 represent the individual fuel flow fields through which the fuel stream is directed to the anodes.

In the illustrated embodiment, the fuel flow fields of individual fuel cells of the stack are manifolded in parallel; however, some or all of them may be manifolded in series. Stack 100 also has ports, and manifolds (not shown) for supplying and exhausting an oxidant stream to and from oxidant flow fields of stack 100. It also has ports and manifolds (not shown) for the flow of coolant through the cell.

In FIG. 2a, port 110 initially acts as the fuel stream inlet and manifold 115 supplies fuel stream to flow fields 130. Port 120 initially acts as the outlet for exhausting a fuel stream from flow fields 130 and manifold 125.

Container 140 supplies a fuel stream (such as hydrogen) to stack 100 via a fuel stream flow switch 150. Fuel stream flow switch 150 controls the directional flow of the fuel stream through stack 100 by controlling which one of ports 110, 120 acts as the fuel stream inlet for flow fields 130.

In FIG. 2a, fuel stream flow switch 150 is set to direct the fuel supply stream via port 110 and exhaust the fuel stream from the fuel cells through port 120. In FIG. 2b, fuel stream flow switch 150 is set so that port 120 acts as the fuel stream inlet, and port 110 acts as the fuel stream outlet. The arrows on lines 130, represent the direction of fuel stream flow through the individual fuel cell fuel flow fields. Accordingly, the arrows on lines 130 indicate that the fuel stream flow direction through the fuel cell fuel flow fields has reversed from FIG. 2a to FIG. 2b.

In FIGS. 2a and 2b, fuel stream flow switch 150 is represented by a single component. However, as will be appreciated by those skilled in the art, fuel stream flow switch 150 may be any device or combination or assembly of components capable of reversing the direction of fluid flow through the fuel flow fields 130. For example, the fuel stream flow switch 150 may comprise various valves cooperatively operated.

In FIGS. 2a and 2b, fuel stream flow switch 150 is schematically depicted as a device with a sliding motion for selecting a setting for controlling the fuel stream flow direction. However, any known type of flow switch or apparatus can be used, for example, one that uses a rotary motion or a pivoting motion.

Since the flow switching generally may be performed a few times over the lifetime of stack 100, it may be preferred simply to operate flow switch 150 manually. Alternatively, a controller 200 may be employed. In FIGS. 2a and 2b, controller 200 comprises mechanism 160 that actuates fuel stream flow switch 150. Mechanism 160 is schematically depicted as a coil spring, compressed in FIG. 2a and released in FIG. 2b. Mechanism 160 can be any type of actuator known in the prior art such as a mechanical actuator, electrical actuator, electromagnetic actuator, pneumatic actuator, hydraulic actuator, or hybrid actuator which combines different types of actuators for movements in different directions.

Actuation of mechanism 160 may be triggered manually, if desired, at appropriate times during the life of stack 100. Alternately, as shown in FIGS. 2a and 2b, controller 200 may also comprise a suitable timer 170 for this purpose.

During operation of the fuel cell stack 100, any of the fuel, oxidant and coolant streams may be reversed individually, such as shown in FIGS. 2a and 2b for the fuel stream. For example, in depicting oxidant stream reversal, ports 110 and 120 would represent oxidant inlet/outlet ports and in depicting coolant stream reversal, ports 110 and 120 would represent coolant inlet/outlet ports. Alternatively, both the fuel and oxidant streams may be reversed or all three of the fuel, oxidant and coolant streams or any combination of the three streams may be reversed.

The method of reversal of fluid flow may be employed to counteract failure of a fuel cell or to prolong the time before a failure occurs. Those skilled in the art will appreciate that numerous options exist for the number and timing of the flow reversals in order to achieve these benefits. Generally, however, the number of reversals performed during the lifetime of the fuel cell is preferably kept small (for example, less than about 10) since the lifetime gain obtained with each additional reversal is expected to diminish. Thus, the lifetime gain associated with more numerous reversals may not offset the inconvenience of additional manual switching operations or the additional cost and potential reliability issues associated with more automated switching. Reversals are preferably performed after operating for a time period that is substantial compared to the mean life expectancy of the fuel cell. For example, the life of a fuel cell stack may be limited by the membrane degrading at a faster rate at the fuel inlet, than in the rest of the cell. The average or mean time period at which this failure occurs can be obtained empirically. If the mean time to failure is found to be 6500 hours, then a fuel flow switch (such as device 150 in FIGS. 2a and 2b) may be operated to switch the fuel inlet and outlet at 5000 hours. In this way the useful life of the cell is prolonged. Similarly, this method can be applied to counteract or delay failures associated with oxidant flow or coolant flow.

While particular elements, embodiments and applications of the present invention have been shown and described, it will be understood, of course, that the invention is not limited thereto since modifications may be made by those skilled in the art, particularly in light of the foregoing teachings. It is therefore contemplated that the appended claims cover such modifications that incorporate those features coming within the scope of the invention.

What is claimed is:

1. A method of operating a fuel cell supplied with a fluid stream, said fuel cell having a mean life expectancy, wherein said mean life expectancy is determined by averaging a plurality of life expectancies of a plurality of fuel cells, said method comprising the step of reversing the direction of flow of said fluid stream after a time period of operation of said fuel cell, wherein said time period is less than said mean life expectancy and said time period is a substantial part of said mean life expectancy.

2. The method of claim 1, wherein said fluid stream is one of a fuel stream, an oxidant stream and a coolant stream.

3. The method of claim 1, wherein said mean life expectancy of said fuel cell is empirically determined.

4. The method of claim 1, wherein said step of reversing the direction of flow of said fluid is performed less than about 10 times over said mean life expectancy of said fuel cell.

5. The method of claim 1, wherein said time period of operation of said fuel cell is equal to about 75% to about 90% of said mean life expectancy.

6. The method of claim 1, wherein said fuel cell is supplied with a fuel reactant stream and an oxidant reactant stream, and said fuel reactant stream is supplied to a first reactant flow field associated with the anode, and said oxidant reactant stream is supplied to a second reactant flow field associated with the cathode of said fuel cell, and said method comprises the step of reversing the direction of flow of both said fuel and oxidant reactant streams through said first and second reactant flow fields.

7. The method of claim 1, wherein said fuel cell is a solid polymer electrolyte fuel cell.

8. The method of claim 1, wherein said fuel cell is one of a plurality of fuel cells in a fuel cell stack and the direction of flow of said fluid stream through each one of said plurality of fuel cells is reversed.

9. The method of claim 1, wherein said fluid stream is supplied to said fuel cell by a supply conduit connected to a first port on said fuel cell.

10. The method of claim 1, wherein said fluid stream is exhausted from said fuel cell by an exhaust conduit connected to a second port on said fuel cell.

11. The method of claim 10, wherein said method comprises the steps of:

disconnecting said supply conduit from said first port;

disconnecting said exhaust conduit from said second port;

connecting said supply conduit to said second port respectively; and connecting said exhaust conduit to said first port.

12. The method of claim 11, wherein said fuel cell is symmetric about said first and second ports and said method comprises the step of rotating said fuel cell to align said second port with said supply conduit and said first port with said exhaust conduit, and said rotating step is performed after said disconnecting step.

* * * * *